United States Patent [19]

Jones

[11] Patent Number: 4,994,651
[45] Date of Patent: Feb. 19, 1991

[54] SOLID STATE TEMPERATURE DEPENDENT DIRECT VOLTAGE INTERRUPTER FOR A HEATER CIRCUIT

[76] Inventor: Thad M. Jones, 1302 High St., South Bend, Ind. 46618

[21] Appl. No.: 360,595

[22] Filed: Jun. 2, 1989

[51] Int. Cl.$^5$ .............................................. H05B 1/02
[52] U.S. Cl. ..................... 219/497; 219/501; 219/494; 219/508; 361/54; 361/56; 361/93; 361/109
[58] Field of Search ................ 219/514, 519, 490–492, 219/494, 497, 499, 501, 505, 485; 361/56, 57, 54, 93, 87, 106, 109, 105

[56] References Cited

U.S. PATENT DOCUMENTS

| | | | |
|---|---|---|---|
| 3,569,784 | 3/1971 | Carroll | 361/55 |
| 4,168,514 | 9/1979 | Howell | 361/106 |
| 4,477,855 | 10/1984 | Nakayama et al. | 361/54 |
| 4,658,322 | 4/1987 | Rivera | 361/106 |
| 4,687,906 | 8/1987 | Fujishima et al. | 219/519 |
| 4,858,054 | 8/1989 | Franklin | 361/55 |

FOREIGN PATENT DOCUMENTS

| | | | |
|---|---|---|---|
| 1563825 | 5/1970 | Fed. Rep. of Germany | 361/54 |
| 0033055 | 3/1977 | Japan | 361/54 |

Primary Examiner—M. H. Paschall
Attorney, Agent, or Firm—Todd A. Dawson

[57] ABSTRACT

A temperature limiting device for connection across a common heater which senses the critical temperature of the heater to trip circuit breakers and thereby disrupt power to the heater when the critical temperature exceeds a predetermined value. The device includes an SCR or triac connected across power lines to the heater and which is triggered by a comparator monitoring the output of an integrator circuit. The input to integrator circuit is connected to the output of a thermocouple device. Upon the critical temperature of the heater exceeding the predetermined value as determined by the integrator and comparator circuits the SCR or triac is fired so as to short the voltage lines and thereby open the mechanically resettable circuit breakers.

1 Claim, 1 Drawing Sheet

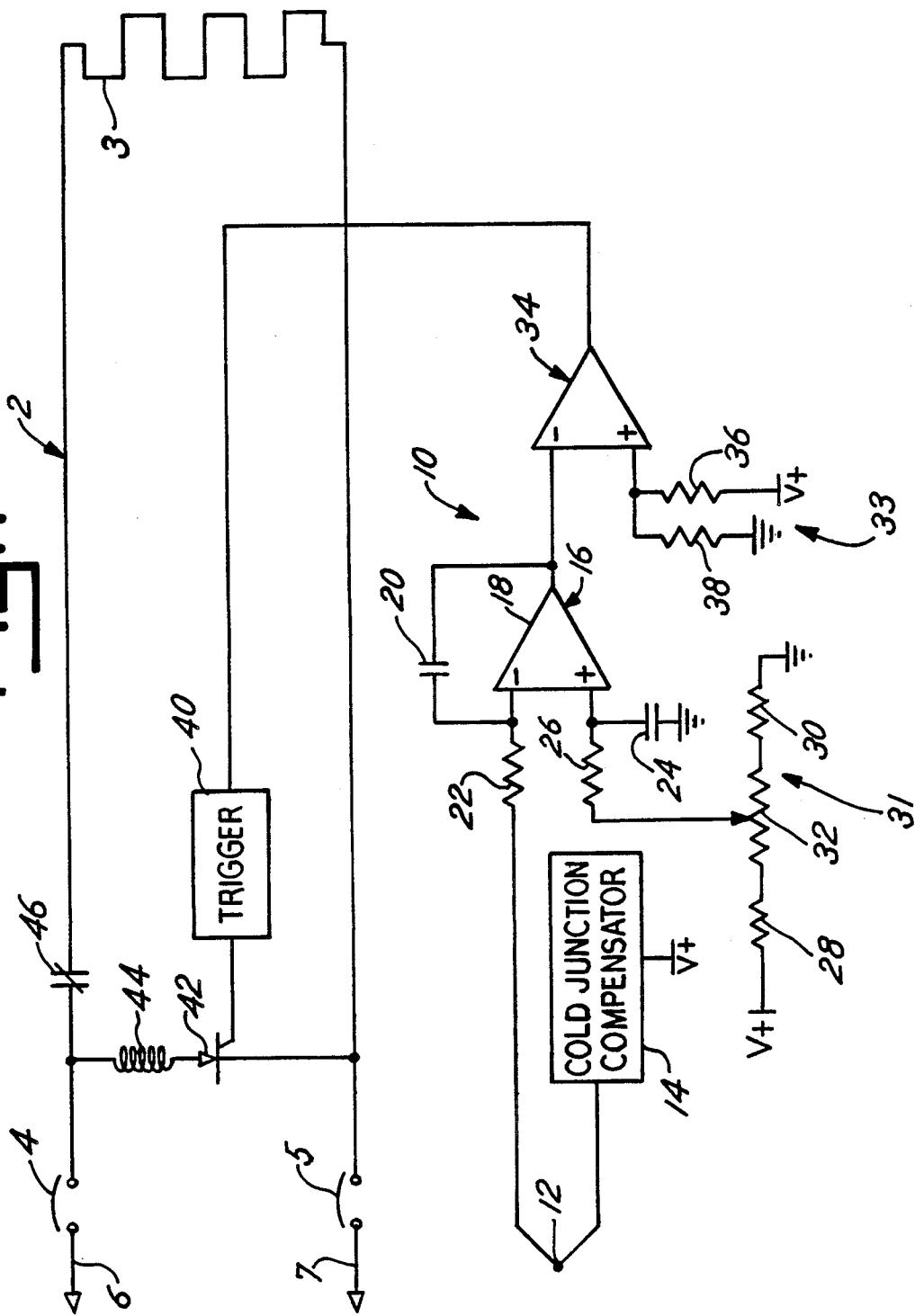

SOLID STATE TEMPERATURE DEPENDENT DIRECT VOLTAGE INTERRUPTER FOR A HEATER CIRCUIT

SUMMARY OF THE INVENTION

This invention relates to a temperature limiting device and will have application to a device which causes mechanical circuit breakers to open upon a high temperature condition being detected.

The temperature limiting device of this invention includes a thermocouple which is compensated for ambient temperatures and connected to a comparator circuit.

The comparator circuit is connected to a trigger circuit which fires a triac connected across the voltage supply lines to trip the circuit breaker when a temperature above a predetermined maximum is detected. The predetermined maximum temperature may be adjusted to accommodate different uses. The device may be connected to an existing circuit without rewiring.

Accordingly, it is an object of this invention to provide for a temperature limiting device.

Another object of this invention is to provide for a temperature sensitive device which utilizes an existing circuit breaker to halt current flow to a load.

Other objects of this invention will become apparent upon a reading of the following description.

BRIEF DESCRIPTION OF THE DRAWINGS

FIG. 1 is a schematical representation of the temperature limiting device of this invention associated with a common heater circuit.

DESCRIPTION OF THE PREFERRED EMBODIMENT

The preferred embodiment herein described is not intended to be exhaustive or to limit the application to the precise form disclosed. Rather it is chosen and described in order to explain the invention so that others skilled in the art might utilize its teachings.

Referring now to FIG. 1, a schematical representation of a common heating circuit 2 is illustrated and includes a heater 3 connected to circuit breakers 4 and 5. Circuit breakers 4 and 5 are connected between heater 3 along voltage supply lines 6 and 7. It should be understood that circuit breakers 4 and 5 are common mechanically resettable circuit breakers which open when their internal temperature exceeds a predetermined value. The internal temperature of the circuit breaker is determined by the amount of current flowing through the breaker such that when a high current flows through the breaker, the internal temperature rises and the contacts of the breaker separate to disrupt power to heater 3.

Temperature limiting device 10 includes a thermocouple 12 which is connected to an external device (not shown) to sense temperature in a critical area of the device warmed by heater 3. For example, thermocouple 12 could be connected to heater to sense its surface temperature. While a thermocouple has been illustrated in the preferred embodiment, the sensors choice is in fact arbitrary. In practice, the choice of sensor technology i.e. thermistor, platinum, RTD, or solid state sensor to name a few depends upon a number of factors including temperature range, linearity, and long term stability required. Any of such temperature sensor could be used while keeping within the teaching of this invention.

Thermocouple 12 is connected between a cold junction compensator circuit 14 shown in block diagram form only and connected to the input of an integrator circuit 16. Compensator circuit 14 is common in the industry and adds to the thermocouple output voltage to compensate for variations in the ambient temperature.

Integrator circuit 16 includes an operational amplifier 18 (op amp) having a capacitor 20 connected between the output of op amp 18 and its negative input lead as shown. A resistor 22 is connected between the negative input lead and thermocouple 12. A capacitor 24 is connected between the positive input lead of op amp 18 and ground potential. A resistor 26 is connected between the positive input lead of op amp 18 and the output of a voltage divider network 31 which includes a variable resistor 32 connected between fixed valve resistors 28, 30. The output of the voltage divider network is to the wiper lead of resistor 32. The voltage divider network is connected between a positive voltage supply (V+) and ground potential. The output of integrator circuit 16 is connected to the positive input lead of a comparator circuit shown as op amp 34. A voltage divider network 33 includes resistors 36 and 38 connected between a positive supply voltage and ground. Resistors 36, 38 are connected to the negative input lead of op amp 34. The output of op amp 34 is connected to a triggering circuit 40 shown in block diagram form only. Trigger circuitry 40 functions merely to insure a proper triggering voltage at the gate of triac 42 and is common in the industry. The output of trigger circuitry 40 is connected to the gate lead of triac 42 which has its main terminal 1 (MT1) connected to one side of heater S. An air core inductor 44 is connected to the main terminal 2 (MT2) of triac 42 and to the other side of heater 3. It should be understood that while triac 42 is illustrated in the preferred embodiment, for currents over 40 amp RMS a pair of back to back thyristers would be used as common in the industry.

Optionally, a thermostat 46 may be included in line with heater 3 to control the system temperature during normal operations.

In operation, the output of op amps 18 and 34 are initially low. When voltage is applied via lines 6 and 7 to heater 3, the heater begins to conduct heat which is transferred to thermocouple 12. The output of thermocouple 12 plus the added voltage of cold junction compensator circuit 14 is fed to integrator circuit 16. When the output voltage from the thermocouple and cold junction compensator circuit 14 exceeds the reference voltage at the positive input lead of op amp 18, as determined by the voltage divider network 31 of resistors 28, 30 and 32, the integrator multiplies the difference by its infinite gain and the output of the op amp 18 goes to a logical high voltage level. When the output of op amp 18 exceeds the reference voltage of op amp 34 as determined by the voltage divider network 33 of resistors 36 and 38, the output of the op amp goes to a logical high voltage level which enables trigger circuit 40 to fire triac 42 and cause it to conduct. Triac 42 conduction causes a current surge that opens circuit breakers 4 and 5. To protect triac 42 from the in rush of current upon conductors, air core conductor 44 is provided which limits the rise rate of current to the triac to a safe value.

With the power disrupted from heater 3, thermocouple 12 begins to cool and the output of op amps 16 and 34 returns to a logical low voltage level so that when circuit breakers 4 and 5 reset, triac 42 is in its open nonconductive state.

It should be understood for proper operation that as is common with integrators, the values of the components associated with integrator circuit 16 must be within a few percent of resistor 26 for proper operation of the integrator Further, it should be understood that common positive and negative voltage supplies to the op amps for clarity have been omitted but are obviously required and known to one skilled in the art.

It should be further understood that this invention is not to be limited to the precise details above but may be modified within the scope of the appended claims.

I claim:

1. In combination, a heater circuit including a heater electrically associated with a voltage source with a circuit breaker member connected between said heater and said voltage source and an interrupter means for directly activating said circuit breaker member and interrupting voltage to said heater, said interrupter means being responsive to an over temperature condition in said heater, said interrupter means further including:

sensing means for directly sensing the temperature of said heater and outputting a voltage, compensation means connected to said sensing means for compensating said voltage from said sensing means for ambient temperature, comparator means connected to said sensing means and compensation means for comparing the compensated voltage from said sensing means to a predetermined maximum voltage representing a maximum temperature, said comparing means outputting a gating voltage when said compensated voltage from said sensing means is greater than said predetermined maximum voltage;

a switch means connected between said voltage source and said heater for conducting current between the voltage source supply lines, said switch means including a triac, the gate lead of said triac being connected to said comparing means, said triac conducts current between said lines when said comparing means outputs said gate voltage, wherein current flow through said triac directly causes excessive current flow through said circuit breaker member causing said circuit breaker member to remove said voltage source from said heater.

* * * * *